2 Sheets--Sheet 1.
J. WHITEHEAD.
Dandy-Rollers for Paper-Machines.
No. 143,801. Patented Oct. 21, 1873.
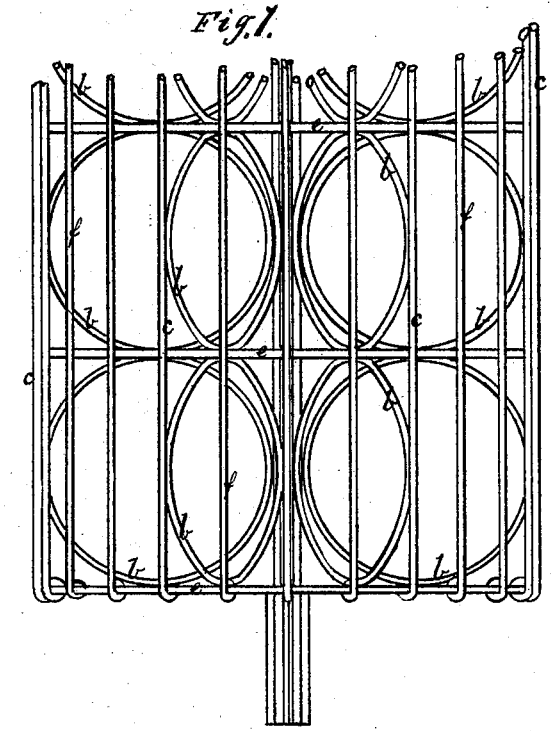
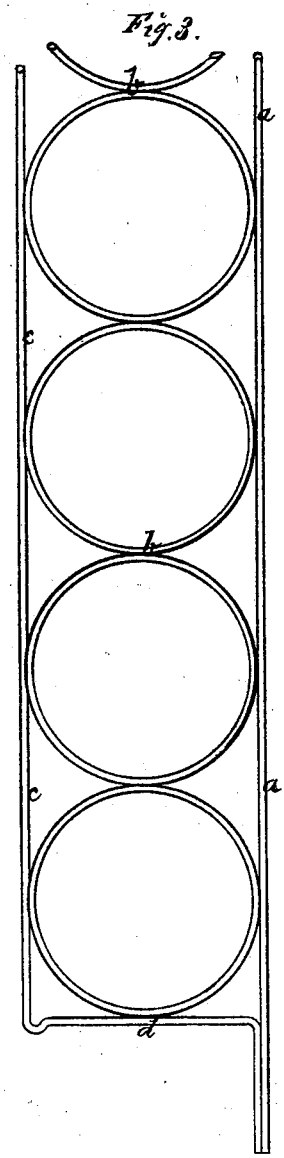
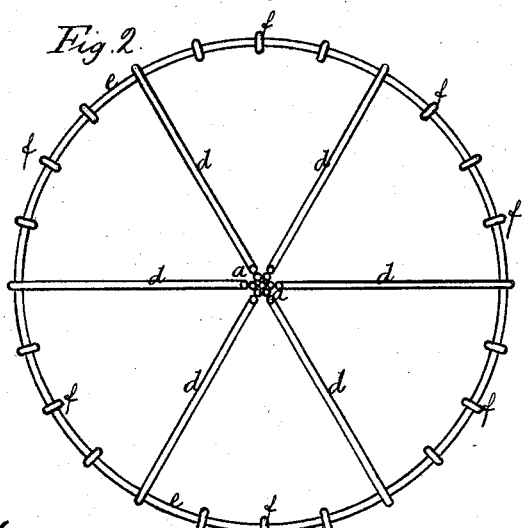
Witnesses
G. Septimus Hughes
Chas. W. Collins
Inventor
John Whitehead 2 Sheets--Sheet 2.
J. WHITEHEAD.
Dandy-Rollers for Paper-Machines.
No. 143,801. Patented Oct. 21, 1873.
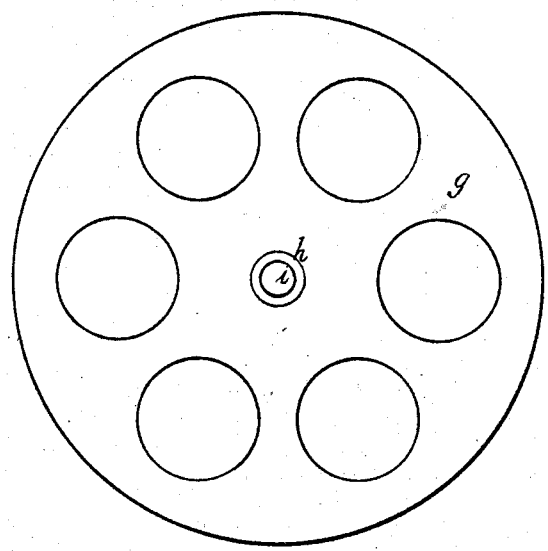
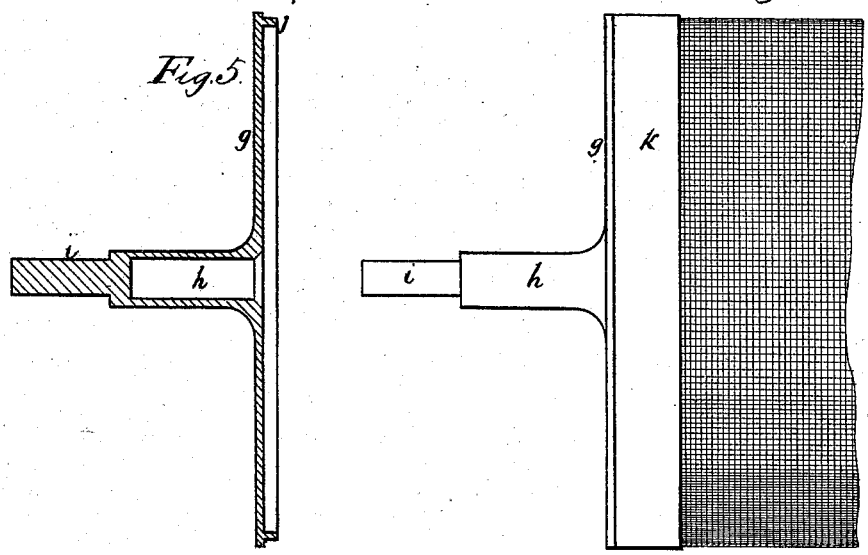

UNITED STATES PATENT OFFICE.

JOHN WHITEHEAD, OF MANCHESTER, ENGLAND.

IMPROVEMENT IN DANDY-ROLLERS FOR PAPER-MACHINES.

Specification forming part of Letters Patent No. 143,801, dated October 21, 1873; application filed July 21, 1873.

*To all whom it may concern:*

Be it known that I, JOHN WHITEHEAD, of Manchester, in the county of Lancaster, England, have invented new and useful Improvements in Dandy-Rollers, used in the manufacture of paper; and I do hereby declare the following to be a full and exact description thereof, reference being had to the accompanying two sheets of drawings, with the figures and letters of reference marked thereon—that is to say:

This invention consists in an improved mode of constructing the dandy-roller for the purpose of obtaining great strength with extreme lightness. Instead of placing the ordinary wire-gauze or laid work constituting the exterior of the roller or rods so placed on heavy wheels fixed to a tubular shaft, I form the body or frame-work of the roller of pieces of wire, soldered or brazed together in several parts, so as to form a strong skeleton frame on which the wire-gauze or laid work is placed.

The manner in which this invention is to be performed will be clearly understood by the following particular description thereof, reference being had to the figures and letters on the accompanying two sheets of drawings, on which Figures 1 and 2 are side and end views of part of a dandy-roller having my improved skeleton frame-work, and Figs. 3, 4, 5, and 6 detached views of part of the same.

To a length of strong wire, $a$, Figs. 1, 2, and 3, I solder with soft or hard solder a line of metallic rings, $b$, which are themselves soldered to each other, and on these rings I solder another length of wire, $c$, which at each end is bent at right angles and soldered to the wire $a$, as shown at $d$, Figs. 2 and 3. I take a number of these wires and rings and solder the wires $a$ on a central wire, and also to each other, to form the shaft of the roller, the wires and rings radiating from the center at equal distances apart, as seen in Fig. 2. To the inner ends of the outer wires $c$, and at intervals corresponding with the diameters of the rings $b$, I solder metallic rings $e$, Figs. 1 and 2, to which I solder wires $f$ for forming, in addition to the wires $c$, the ribs which carry the wire-gauze or laid work; and, for giving a proper finish to the ends of the roller, and obtaining smooth surfaces at the ends of the shaft, I employ a flange at both ends of the roller, each flange having a projecting tube and pivot, as shown in the end view Fig. 4, longitudinal section Fig. 5, and side view Fig. 6, in which $g$ represents the flange, $h$ the tube, and $i$ the pivot. The tube $h$ is forced on the wires $a$ at the end of the shaft; and the ends of the ribs $c$ and $f$, which are nearly equal to the length of the roller, are placed within the rim $j$ of the flange; and the wire-gauze or laid work is brought close to the edge of the rim, after which a metallic band, $k$, Fig. 6, is soldered on the rim and the end of the wire-gauze or laid work, and completes that end of the roller, the other end of which is formed in the same manner.

All the figures are drawn about half-size, but the dimensions and strength of the several parts, and the number of arms formed by the wires and rings, or their substitutes, are varied according to the required diameter of the roller.

It will be readily perceived that, by this improved mode of constructing the frame-work of the dandy-roller, great strength and lightness are obtained, and, as all the parts are made of round wire of small diameter, there is but little surface for the accumulation of dirt or floss, and, therefore, there is the additional advantage of extreme cleanliness.

I claim—

The dandy-roll, constructed with the bent or ring-shaped wires, arranged in planes radial to the axis of the roll, and secured by solder to the central shaft of the roll, and to the wires constituting the outer or circumferential portions provided to sustain the wire-cloth covering, substantially as and for the purpose specified.

Manchester, England, July 4, 1873.

JOHN WHITEHEAD.

Witnesses:
G. SEPTIMUS HUGHES,
CHAS. W. COLLINS.